(12) United States Patent
Hoffman et al.

(10) Patent No.: US 7,046,524 B2
(45) Date of Patent: May 16, 2006

(54) POWER SUPPLY DEVICE COMPRISING SEVERAL SWITCHED-MODE POWER SUPPLY UNITS THAT ARE CONNECTED IN PARALLEL

(75) Inventors: Hans Hoffman, Augsburg (DE); Robert Rathmann, Rosenheim (DE); David Wiesmueller, Langweid (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/508,825

(22) PCT Filed: Mar. 28, 2003

(86) PCT No.: PCT/EP03/03275

§ 371 (c)(1),
(2), (4) Date: Sep. 22, 2004

(87) PCT Pub. No.: WO03/084040

PCT Pub. Date: Oct. 9, 2003

(65) Prior Publication Data

US 2005/0094422 A1    May 5, 2005

(30) Foreign Application Priority Data

Mar. 28, 2002  (DE) ............................ 102 14 190

(51) Int. Cl.
*H02M 3/335*    (2006.01)
(52) U.S. Cl. ................. 363/21.09; 363/21.01
(58) Field of Classification Search ........... 363/16, 363/17, 20, 21.01, 21.04, 21.07, 21.09, 21.1, 363/65, 97, 98, 131, 132
See application file for complete search history.

(56) References Cited

U.S. PATENT DOCUMENTS

| 4,816,739 | A |   | 3/1989 | Sakurai et al. |         |
|-----------|---|---|--------|----------------|---------|
| 5,319,536 | A | * | 6/1994 | Malik          | 363/65  |
| 5,513,094 | A | * | 4/1996 | Stanley        | 363/98  |

(Continued)

FOREIGN PATENT DOCUMENTS

DE       42 10 817 A1    10/1993

(Continued)

*Primary Examiner*—Matthew V. Nguyen
(74) *Attorney, Agent, or Firm*—Faegre & Benson LLP

(57) ABSTRACT

The invention relates to a power supply device having several switch-mode power supplies connected in parallel to supply at least one consuming unit, each switch-mode power supply generating an output current $I_0$ and an output voltage $U_0(I_0, R_L)$ that is a function of the output current $I_0$ and a load resistance $R_L$, and having a control device for each switch-mode power supply, the control device having a first stage with a P element (54) that receives a P element input voltage which is derived from the output voltage $U_0(I_0, R_L)$, and generates a P element control voltage $U_{VS}$, that is used to control the respective switch-mode power supply, the first stage being active when $0 \leq I_0 \leq I_{0P}$, a second stage having a current reproduction circuit which reproduces the output current $I_0$ of the respective switch-mode power supply and generates an output current control voltage $U_P$ which is used to control the respective switch-mode power supply, the second stage being active when $I_{0P} \leq I_0 \leq I_{0S}$, and a third stage having an amplifier circuit which amplifies a signal proportional to the output current $I_0$ and generates an amplified output current control voltage $m \cdot U_S$ which is used to control the respective switch-mode power supply, the third stage being active when $I_{0S} \leq I_0 \leq I_K$.

15 Claims, 5 Drawing Sheets

U.S. PATENT DOCUMENTS 6,320,771 B1 * 11/2001 Hemena et al. ............... 363/70
6,373,732 B1 * 4/2002 Patel et al. .................... 363/72
6,388,898 B1 * 5/2002 Fan et al. ...................... 363/20
6,738,270 B1 * 5/2004 Saga et al. ..................... 363/50

FOREIGN PATENT DOCUMENTS

DE        100 19 329 A1    10/2001
JP        07085727          4/1995

* cited by examiner

CHARACTERISTICS ("SOFT CHARACTERISTICS") OF n PARALLEL SWITCH-MODE POWER SUPPLIES

SYMMETRIC CABELING IS ONE OF THE PRECONDITIONS FOR PARALLEL CONNECTION OF SWITCH-MODE POWER SUPPLIES

US 7,046,524 B2

POWER SUPPLY DEVICE COMPRISING SEVERAL SWITCHED-MODE POWER SUPPLY UNITS THAT ARE CONNECTED IN PARALLEL

CROSS REFERENCE TO RELATED APPLICATIONS

This application is a National Stage of International Application No. PCT/EP03/03275, filed Mar. 28, 2003, which claims priority to German patent application 102 14 190.8, filed Mar. 28, 2002, the entire contents of each of which are hereby incorporated by reference.

FIELD OF THE INVENTION

The invention relates to a power supply device having several switch-mode power supplies connected in parallel to supply at least one load, each switch-mode power supply generating an output current and an output voltage, and having a control device for each switch-mode power supply. The control device controls the output voltage of the switch-mode power supply which is a dependent on the output current and a load resistance.

BACKGROUND OF THE INVENTION

The basic principles of switch-mode power supplies connected in parallel are described, for example, in Elektronik, Volume 13, 2000, pages 114–118 "Schaltnetzteile parallel geschaltet-technische Details zur passiven Stromaufteilung" by Martin Rosenbaum. The aim of connecting switch-mode power supplies in parallel is to increase the power by increasing the output current and to reduce the failure rate by providing redundant switch-mode power supplies in such a way that a defective power supply unit can be exchanged during the operation of a device which is supplied by the switch-mode power supplies. Connection in parallel can be realized by means of an active current division or a passive current division.

Active current division measures the output current of each power supply and controls the output voltages as a function of the output current of all switch-mode power supplies resulting in a uniform division of current to one or more loads. This method has the advantage that an exact division of current and a uniform load on the switch-mode power supplies connected in parallel can be achieved. The disadvantages can be seen in the greater complexity of the circuitry and the higher costs thus incurred.

In the case of passive current division, the current division is made as uniform as possible by setting a "softer output characteristic" for the switch-mode power supply as shown, for example, in FIG. 1. The advantages include a less complex circuitry and the almost limitless number of switch-mode power supplies that can be connected in parallel. A disadvantage is the somewhat less exact division of current in some applications.

FIG. 2 shows a block diagram of an example for N switch-mode power supplies 10, 11, 12 connected in parallel which supply a load 13. Further details on the circuit illustrated in FIG. 2 are illustrated and explained in the above-mentioned article in Elektronik 13/2000. Reference is made to this publication.

In order to set the output characteristics of the individual switch-mode power supplies connected in parallel as required, where passive current division is concerned the prior art provides for one or more shunt resistors to be added to the output line of the respective switch-mode power supplies so that the output voltage of the respective switch-mode power supplies is established as a function of the load, within certain tolerances, according to predetermined characteristics. FIG. 3 shows an example of such an output characteristic for a single switch-mode power supply which has three ranges that can be established by the provision of three shunt resistors connected in the output line of the switch-mode power supply.

The output characteristic shown in FIG. 3 occurs in a first range I, which characterizes the normal operation of the switch-mode power supply, being relatively flat with only a slight voltage drop following an increase in output load and thus an increase in output current. A first shunt resistor $R_{VS}$ is active in this range I, which could also be formed by the line resistance. When the output current $I_0$ exceeds a first threshold value $I_{OP}$, a second shunt resistor $R_P$ is connected which causes the voltage at the output of the switch-mode power supply to fall more strongly. This second range, indicated by II, can, for example, be a charging range in which the power supplies not only supply a load but also charge batteries or other energy storage units, which are intended as an emergency power supply to supply the load during a power failure.

When the output current $I_0$ of the respective switch-mode power supply exceeds a further threshold value $I_{OS}$, a third shunt resistor is activated which is dimensioned in such a way that the voltage output characteristic of the switch-mode power supply declines abruptly. This range, indicated by III, can be considered a safety cut-off range in which the switch-mode power supply is short circuited and turned off when a specific threshold current $I_{OS}$ is exceeded. The third shunt resistor is indicated by $R_S$.

Although the above-described prior art solution for establishing the output characteristic of the switch-mode power supplies as a function of the output current has a simple circuitry and allows for different operating ranges of the output characteristic, the shunt resistors, which can be located in the power supply unit or outside it in the output line of the switch-mode power supply (s.$R_L$ in FIG. 2), generate considerable losses and thus reduce the overall efficiency of the power supply and of the system.

The object of the invention is to provide a power supply device having several switch-mode power supplies connected in parallel to supply at least one load which operates with a passive current division and allows the output characteristic of each switch-mode power supply to be adjusted for different operating ranges. This object is solved by a power supply device having the characteristics outlined in claim 1.

SUMMARY OF THE INVENTION

The invention proposes a power supply device having several switch-mode power supplies connected in parallel to supply at least one load in which each switch-mode power supply generates an output current $I_0$ and an output voltage $U_0(I_0, R_L)$, which is a function of the output current $I_0$ and an associated load resistance $R_L$. A control device is provided for each switch-mode power supply. In accordance with the invention, the control device is divided into three stages for the purpose of creating an output voltage characteristic of the respective switch-mode power supply having three operating ranges. These three operating ranges are preferably characterized by an output characteristic of the switch-mode power supply which declines more steeply as the load, and thus the output current, increases, as shown for example in FIG. 3.

The first stage has a P (proportional) element that receives a P element input voltage which is derived from the output voltage $U_0(I_0, R_L)$, and generates a P element control voltage $U_{VS}$ that is used to control the respective switch-mode power supply. The P element generates a slightly declining output characteristic whose height can preferably be adjusted. The first stage is active in a normal operating range up to a first threshold value $I_{OP}$ of the output current $I_0$ and can be deactivated on exceeding the threshold value $I_{OP}$.

The second stage has a current imaging circuit which reproduces the output current $I_0$ of the respective switch-mode power supply and generates an output current control voltage $U_P$ which is used to control the respective switch-mode power supply. The output current control voltage $U_P$ is directly proportional to the output current $I_0$ and is adjusted in such a way that a more strongly declining output characteristic of the switch-mode power supply is produced. The second stage is active when the output current $I_0$ exceeds the first threshold value $I_{OP}$ which is selected in such a way that it characterizes, for example, a departure from the normal operation and a transition to a charging operation of the switch-mode power supply, as described above with reference to FIG. 3.

The third stage has an amplifier circuit which amplifies a signal proportional to the output current $I_0$ and generates an amplified output current control voltage $U_S$ which is used to control the respective switch-mode power supply. The third stage is preferably connected down-stream from the second stage and uses the output current control voltage $U_P$ as its input signal. The amplification of the third stage is preferably adjusted in such a way that a steeply declining output characteristic of the switch-mode power supply is produced. The third stage is active when the output current $I_0$ exceeds a second threshold value $I_{OS}$ which, for example, indicates an overload condition making it necessary to turn off the switch-mode power supply.

The power supply device according to the invention makes it possible to adjust the output characteristic of a switch-mode power supply according to specifications in several different operating ranges, the adjustment being largely loss-free due to the use of the P element, the current imaging circuit and the amplifier circuit, but nevertheless requiring a less complex circuitry than is the case with an active current division which is based on measuring the output currents of all the switch-mode power supplies and effecting control depending on the measurement of all the switch-mode power supplies.

According to the invention, the operating ranges in which the first, second or third stage are active are controlled as a function of the output current $I_0$. The ranges are indicated in FIG. 3 by I, II, III. If $I_0$ is located in range I, only the first stage is active; if $I_0$ is located in range II, the second stage is active, the P element of the first stage draws the output voltage of this first stage to zero, as described in more detail below, so that the first stage no longer exerts any influence. If the output current $I_0$ is located in range III, although the second stage remains active, the third stage dominates due to the considerably higher amplification factor so that the contribution of the second stage to the control voltage can be largely disregarded, as is explained below in more detail.

The control device preferably comprises a pulse width modulator component with an integrated coupling amplifier which receives the P element control voltage $U_{VS}$, the output current control voltage $U_P$ and the amplified output current control voltage $mU_S$ and generates a control signal $V_T$ for the respective switch-mode power supply as a function of these control voltages. Depending on which stage is activated, the pulse width modulator component receives the P element control voltage $U_{VS}$, the output current control voltage $U_P$ and/or the amplified output current control voltage $mU_S$.

In a preferred embodiment, the first stage includes a voltage divider that determines the size of the output voltage $U_0$ and generates a P element input voltage that is proportional to the output voltage $U_0$. In addition, the output characteristic of the switch-mode power supply can be shifted using a controlled current source that is connected to the voltage divider, as described in more detail below.

The P element of the first stage preferably has an operational amplifier, one of whose inputs receives the P element input voltage and whose other input receives a first reference voltage $U_{ref1}$ and whose output emits the P element control voltage $U_{VS}$. The operational amplifier is preferably connected to the pulse width modulation component via a blocking diode.

The current imaging circuit of the second stage preferably has a transformer element that is connected in parallel to the main transformer element of the respective switch-mode power supply and generates an output signal that is proportional to the output current $I_0$ of the switch-mode power supply. This is explained in more detail with reference to the figures.

The amplifier circuit of the third stage preferably takes the form of an operational amplifier, one of whose inputs being connected to the current imaging circuit of the second stage and whose other input is connected to the reference voltage and whose output emits the amplified output current control voltage.

From DE 100 19 329, a power supply having several switch-mode power supplies connected in parallel is known which is regulated to generate an output characteristic in several sections. A first segment of the characteristic has a constant output voltage, a second segment corresponds to a straight line with a declining gradient and a third segment provides a short-circuit current limiter. In the first stage, DE 100 19 329 uses an I (integrating) element to generate a constant output voltage to regulate the current—in contrast to operating range I according to the invention. The prior art circuit, however, would not function with a pure P (proportional) element. One reason is that in DE 100 19 329 the current is mainly measured by using an optocoupler. The optocoupler amplification or attenuation influences the open-loop gain which determines the gradient of the characteristic. The optocoupler amplification, however, is not linear and is heavily dependent on the temperature, it is also dependent on the respective tolerances of the actual components used. Thus the solution revealed in DE 100 19 329 is not suitable for the generation of identical, reproducible characteristics for several switch-mode power supplies connected in parallel since by using different optocouplers, each switch-mode power supply would generate a deviating, non-predictable characteristic making a defined current division impossible. Moreover, the optocoupler generates non-linearities which have to be compensated by correspondingly high amplification.

An advantage of using a P element according to the invention is that current-dependent characteristics can be generated, in contrast to segment 1 of DE 100 19 329, and that the equations of the straight lines can be set more easily. This is important for the load division when several power supplies are operated in parallel.

Another very important difference between the invention and DE 100 19 329 is that DE 100 19 329, like the prior art described above, operates with a resistance shunt in the output branch. The output characteristic is mainly established by the resistance shunt and the entire output current passes through this shunt. As a result, considerable losses are incurred. Moreover, the characteristic can be less flexibly adjusted than in the invention.

In contrast, the invention does not need an ohmic load to establish the characteristic in the output branch, it being possible to set any required curve equations. The invention can nevertheless realize short circuit current limitation.

SHORT DESCRIPTION OF THE DRAWINGS

The invention is described in more detail below on the basis of preferred embodiments with reference to the drawings. The figures show:

FIG. 1 a diagram with three output characteristics of three switch-mode power supplies connected in parallel according to the prior art;

DESCRIPTION OF THE PREFERRED EMBODIMENT

Figure 1:
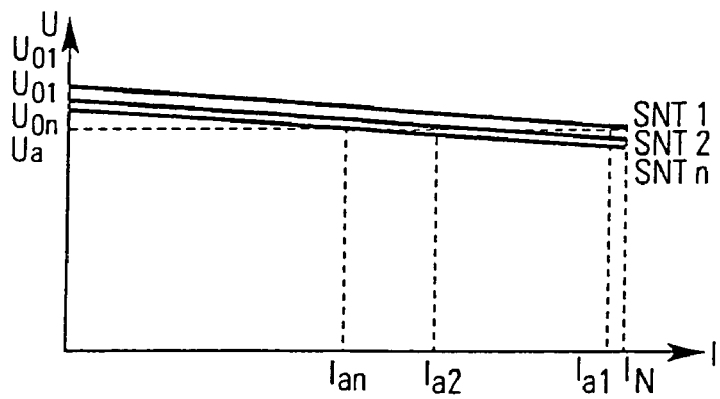
Figure 2:
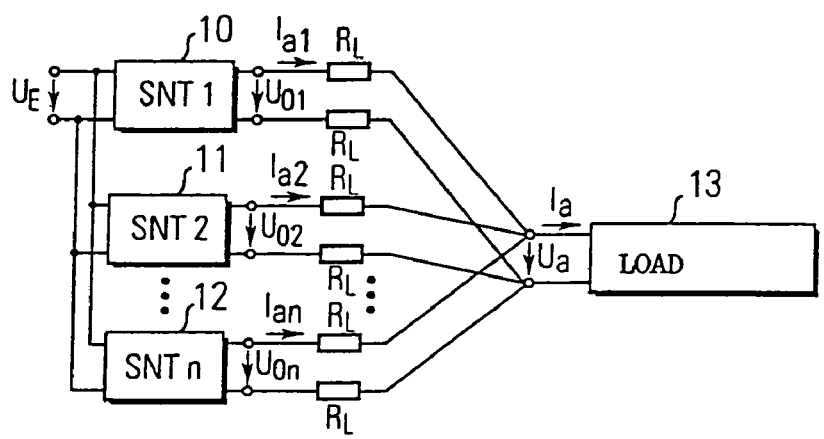
FIG. 2 shows in block diagram form the connection in parallel of several switch-mode power supplies to supply a load according to the prior art.

FIG. 1, which has been described above, shows a diagram with three so-called "soft" characteristics of three switch-mode power supplies connected in parallel with a passive current division according to the prior art. An example of three or n switch-mode power supplies connected in parallel according to the prior art is shown in FIG. 2. FIG. 2 shows a first switch-mode power supply 10, a second switch-mode power supply 11, and an nth switch-mode power supply 12, which are connected in parallel and wired symmetrically to a load 13. The line resistances of the wiring are schematically represented by the resistors $R_L$. In the arrangement shown in FIG. 2, the line resistors $R_L$ correspond to the first shunt resistor to set the output characteristic of each switch-mode power supply 10, 11, 12, it being necessary in the prior art to provide an additional shunt resistor in order to achieve an exact current division. This solution is inflexible, however, and results in additional losses at the shunt resistor.

Figure 3:
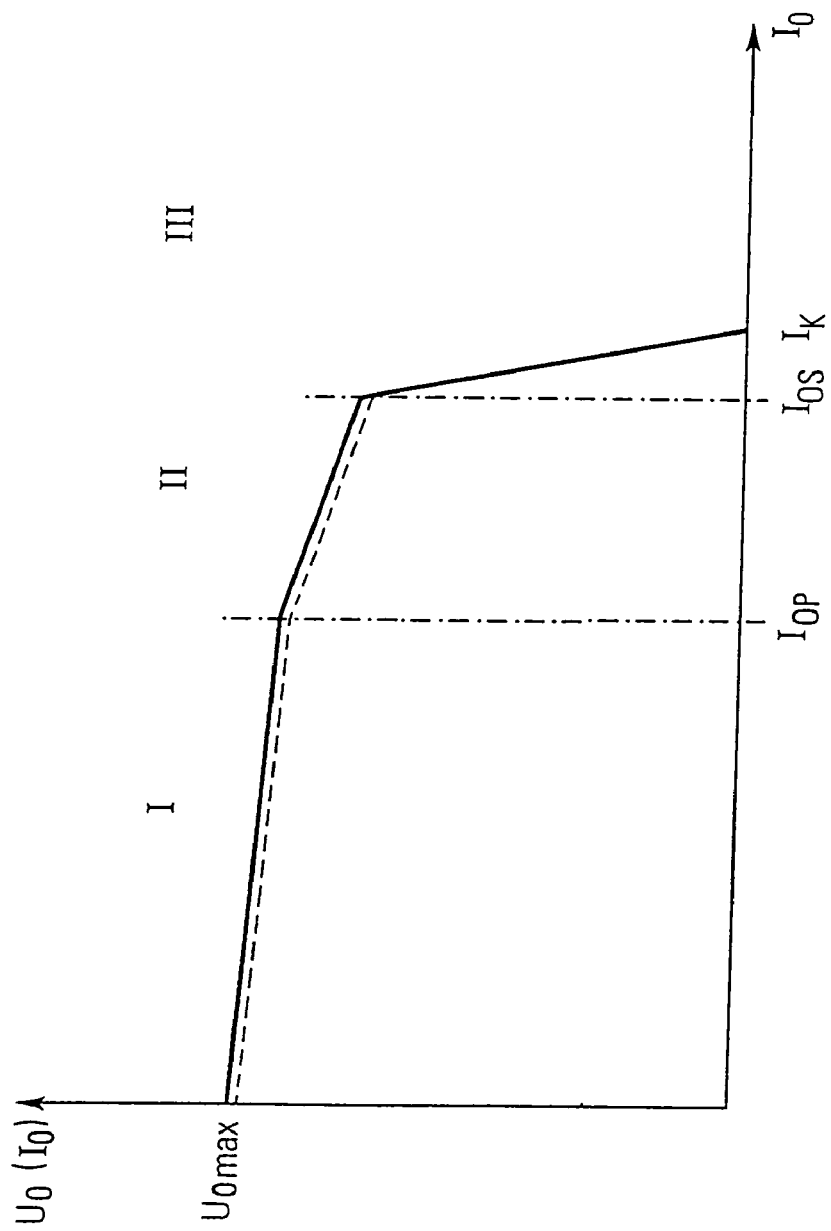
FIG. 3 shows the diagram of an output characteristic of a switch-mode power supply which is to be established according to the invention.

FIG. 3, which has been described above, shows an output characteristic of a switch-mode power supply having three operating ranges which are to be created by the power generating device according to the invention. Applied to the schematic representation in FIG. 2, it is the object of the invention that each of the switch-mode power supplies 10, 11, 12 generates an adjustable output characteristic, such as an output characteristic in accordance with FIG. 3 or any other, without the need for loss-related shunt resistors. FIG. 3 shows a first operating range I which characterizes the normal operation of the power supply device and ends at a first threshold current $I_{OP}$, a second operating range II, which characterizes the charging operation of the power supply device according to the invention and ends at a second threshold current $I_{OS}$, and a third operating range III, which characterizes the cut-off range of the power supply device according to the invention, the power supply device cutting out completely when there is a short-circuit current $I_K$.

Figure 4:
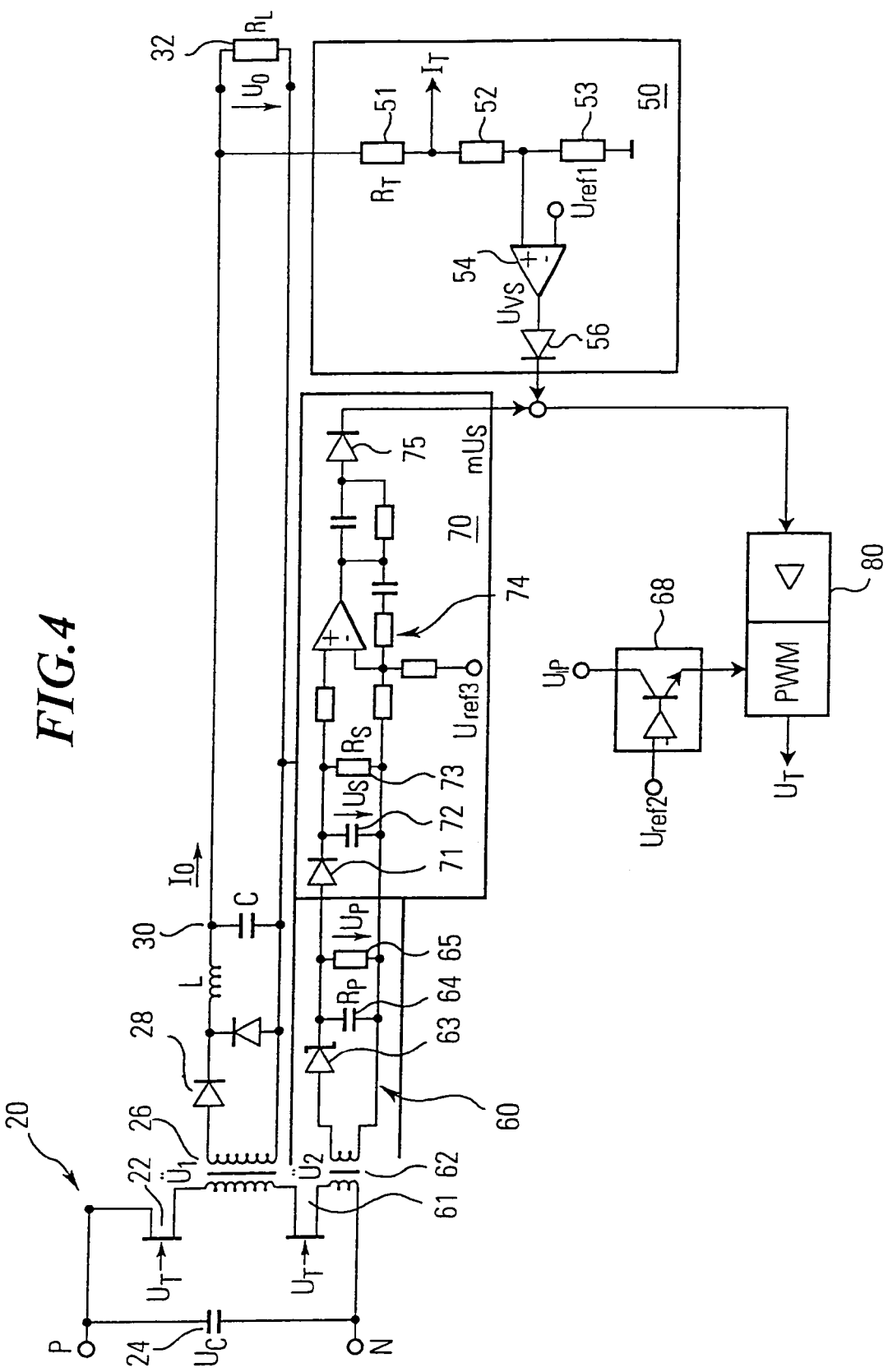
FIG. 4 shows a circuit diagram of a power supply device having a control device according to the invention, with only the output stage of a switch-mode power supply being schematically represented in FIG. 4.

FIG. 4 shows a schematic circuit diagram of the power supply device according to the invention with only the output stage of a switch-mode power supply and the associated control device being schematically illustrated in FIG. 4.

FIG. 4 schematically illustrates the output stage of a switch-mode power supply 20 having a controlled electronic switch 22, which is a MOS-FET in the illustrated embodiment but can be realized as an IGBT or any other suitable transistor switch, and a storage capacitor 24 as well as an output transformer 26. Downstream from the output transformer 26 are an output/free-wheeling diode 28 and an LC circuit 30 which rectify the chopped output voltage of the transistor switch 22 and transformer 26. The output current of the switch-mode power supply 20, that is illustrated only schematically in FIG. 4, is indicated by $I_O$, and the output voltage is indicated by $U_O$. At the output of the switch-mode power supply 20, a load resistor $R_L$ 32 is illustrated in FIG. 4 representing one or more loads. In the embodiment illustrated in FIG. 4, the output stage of the switch-mode power supply 20 further comprises a second controlled electronic switch 61 which is controlled in common mode with the first switch 22.

Figure 5:
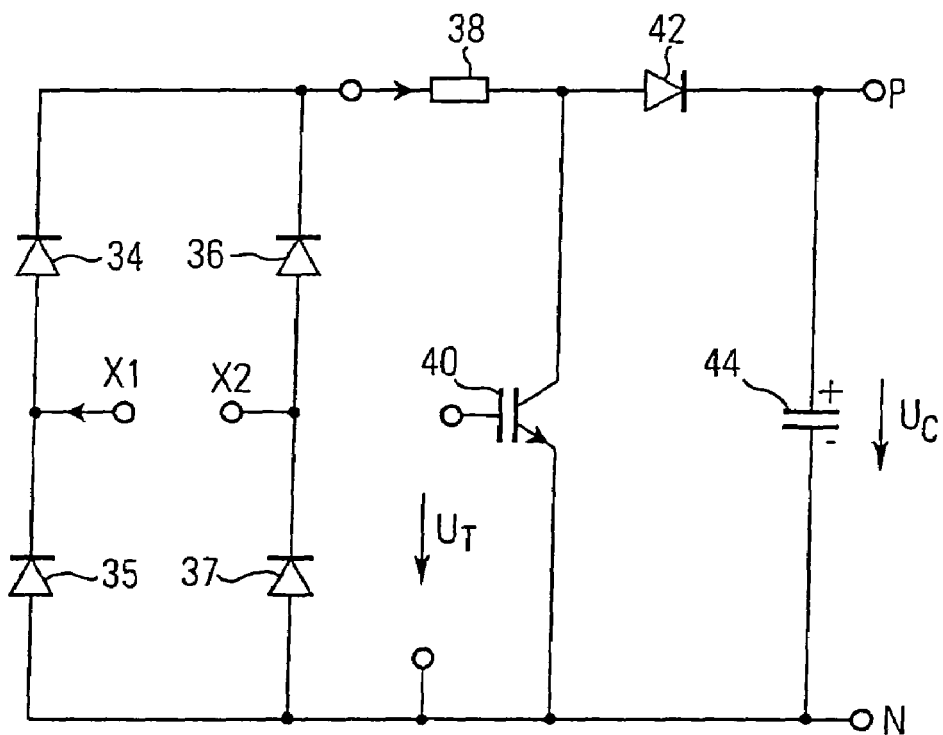
FIG. 5 shows a circuit diagram of the input stage of a switch-mode power supply according to the prior art which could be used in conjunction with the invention.

For explanatory purposes, FIG. 5 shows an example of an input stage of the switch-mode power supply according to the prior art which can be connected upstream of the output stage shown in FIG. 4. However, this input stage of a switch-mode power supply serves only by way of example since the invention can be realized using all kinds of switch-mode power supplies. In particular, the switch-mode power supply of FIG. 5 comprises an input rectifier consisting of four rectifier diodes 34, 35, 36, 37, which are arranged in the form of a bridge circuit. The rectifier bridge receives its input AC voltage, in particular a mains voltage, at the connections X1, X2 and sends its rectified output voltage via a storage and smoothing inductor 38, through which a current passes in one direction only, to a controlled electronic switch 40 which is connected via the output of the bridge rectifier. The transistor switch 40 receives a control voltage $U_t$, which is not specified in more detail in FIG. 5 and determines the output voltage of the switch-mode power supply. Associated with the transistor switch 40 is an output/free-wheeling diode 42 which rectifies the chopped output voltage of the transistor switch. At the output of the switch-mode power supply, a unipolar storage capacitor 44 is connected to store and smooth the output voltage.

According to a well-known control method, the controlled electronic switch 40, or 22, 61 in FIG. 4, is operated at a high switching frequency $U_T$ compared to the mains frequency of the AC voltage supply (at the connections X1, X2). By changing the relative switch-on duration of the electronic switch 40 or 22, 61, it is possible to adjust the output voltage $U_C$ at the capacitor 44 or 24 and thus the output voltage of the switch-mode power supply $U_O$.

Referring again to FIG. 4, we will now describe how the control voltage $U_T$ is determined by means of the three-stage control device according to the invention. The first stage of the control circuit according to the invention is illustrated in FIG. 4 in a box indicated by 50, the second stage is in a box indicated by 60 and the third stage is in a box indicated by 70.

The first stage 50 of the control circuit comprises a voltage divider consisting of resistors 51, 52, 53, a P element, that takes the form of an operational amplifier 54, and a blocking diode 56. These components are connected to each other as shown in FIG. 4. The output voltage $U_{OMAX}$ can be adjusted via the voltage divider 51, 52, 53 and a selectable, constant first reference voltage $U_{REF1}$.

The voltage divider 51, 52, 53 is dimensioned in such a way that for the required output voltage $U_0$, a voltage is generated at the connection between the resistors 52 and 53, this voltage essentially corresponding to the first reference voltage $U_{REF1}$. Accordingly, the P element 54 generates a P element control voltage $U_{VS}$, which is applied via the diode 56 to a pulse width modulation component 80 in order to control the switch-mode power supply 20 in such a way that produces the slightly declining output characteristic (due to the effect of the P element) in range I of FIG. 3.

In a preferred embodiment of the invention as shown in FIG. 4, a current reduction device 58 can be provided to adjust $U_{OMAX}$ in order to generate a characteristic field according to requirements. A second characteristic with a slightly downwards shifted $U_{OMAX}$ is shown in FIG. 3, for example, by the broken line. For this purpose, the voltage divider is divided into the resistors 51 ($R_T$) and 52 and a controlled current source or a current reduction device 58 is connected to the connecting point between the resistors 51 and 52. The current reduction device 58 draws a constant current $I_T$ through the resistor 51 ($R_T$), so that at the resistor 51, an additional constant, adjustable voltage drop occurs which shifts the output characteristic of the switch-mode power supply as required.

The output signal $U_{VS}$ of the P element 54 is applied to the pulse width modulation component 80, having an integrated coupler amplifier, which generates the control signal $U_T$ for the switch-mode power supply 20.

As long as the output current $I_0$ of the switch-mode power supply 20 remains under a predetermined first threshold value $I_{OP}$, that characterizes the end of a normal operating range I, the second stage 60 and the third stage 70 do not emit any output signals. The output voltage of the switch-mode power supply 20 is then given as:

$$U_0(I_0) = U_{OMAX} - R_{VS} * I_0 - R_T * I_T$$

where $$R_{VS} = \frac{R_{Powerloss}}{Closedloopgain}$$

When the output current $I_0$ exceeds the first threshold value Iop, the second stage 60 is activated in the illustrated embodiment. The second stage 60 is active in range II, the output voltage $U_0$ in this range being smaller than the first reference voltage $U_{REF1}$, so that the P element 54 of the first stage has a high-ohmic output and the first stage 50 thus makes no further contribution to the adjustment of the control signal $U_T$.

The second stage 60 of the control device consists of a transformer 62, a zener diode 63, a capacitor 64 and a resistor $R_P$ 65, which are connected to each other as shown in FIG. 4. The transformer 62 is controlled by the electronic switch 61.

The control signal $U_T$ is applied in parallel to the two electronic switches 22, 61 so that they are switched in common mode. The primary current of the switch-mode power supply, which flows through the switches 22, 61 and the transformer 62, corresponds exactly with the secondary current through the diodes 28, multiplied by $ü_1$. The transformer 62 divides the primary current by $ü_2$. Thus the output current through the second transformer 62 is an exact replica of the output current $I_0$ of the main transformer 26 divided by ($ü_1 \cdot ü_2$). The voltage drop via the resistor $R_P$ 65 is thus a measure for the output current $I_P$, according to the following equation:

$$U_P = \frac{I_O \cdot R_P}{ü_1 \cdot ü_2}$$

Thus with the aid of the second transformer 62, a replica of the output current $I_0$ can be generated without any significant current load on the switch-mode power supply. The output voltage $U_P$ of the second stage 60 is applied to the pulse width modulation component 80 via a controlled switch 68. At a control input, the controlled switch 68, schematically illustrated in FIG. 4 by a comparator and a transistor switch, receives a second reference voltage $U_{REF2}$ which is selected in such a way that the output signal $U_P$ of the second stage is only imposed on the pulse width modulation component 80 when the output current $I_0$ exceeds the second threshold value $I_{OP}$. For this purpose, $U_{REF2}$ is adjusted as follows:

$$U_{REF2} = \frac{I_{OP} \cdot R_P}{ü_1 \cdot ü_2}$$

the output voltage $U_P$ of the second stage 60 is applied to the pulse width modulation component 80 as described above in order to control the pulse width modulation component 80 and to generate a required control signal $U_T$ for the switch-mode power supply.

On activation of the second stage 60, the output voltage $U_0$ of the switch-mode power supply 20 is given as:

$$U_0(I_0) = U_0(I_{OP}) - k * R_P * I_0$$

where $$k = \frac{1}{ü_1 \cdot ü_2}$$

It is clear that through a suitable choice of $R_P$, the rise in the output characteristic of the switch-mode power supply 22 can be influenced. Since the characteristic is only adjusted with the aid of the current imaging, it is not necessary to add another resistor to the actual output circuit of the switch-mode power supply so that losses can be kept to a minimum.

When the output current $I_0$ then exceeds a second threshold value $I_{OS}$, the third stage 70 of the control circuit is activated. The activation of the third stage 70 can be adjusted via a third reference voltage $U_{REF3}$, where $$U_{REF3} = \frac{I_{OS} \cdot R_P}{\bar{U}_1 \cdot \bar{U}_2}$$

The third stage 70 of the control circuit consists of an input diode 71 and a capacitor 72, which form an input rectifier, as well as an amplification circuit, which is indicated in its entirety by 74 and, alongside other resistors and capacitors, has an input resistor $R_S$ 73, and an output diode 75, which are connected to each other as shown in FIG. 4. The third stage 70 of the control device receives as its input signal the output signal $U_P$ of the second stage 60 which is proportional to the output current $I_0$ of the switch-mode power supply 20. Up is a pulsed signal dependent on the control signals $U_T$. This pulsed signal $U_P$ is rectified by the rectifier part 71, 72 of the third stage 70 so that a rectified voltage $U_S$ is applied at the input resistor $R_S$ 73 of the amplifier part 74 of the third stage, the amplitude of the rectified voltage corresponding to the voltage $U_P$. The third stage 70 generates a control signal $U_S = U_P$ (rectified)= $k \cdot R_P \cdot I_0$, that is amplified by the amplifier circuit 74. The amplifier circuit 74 is designed in such a way that it has a relatively high amplification factor, m>>1. An output signal $m \cdot U_S$ is produced.

The output signal $mU_S$ of the third stage 70 is entered into the pulse width modulation component 80 in order to generate the control signal $U_T$ that generates a steep output characteristic $U_0$ of the switch-mode power supply 20 which, for a short-circuit current $I_K$, becomes 0 (see range III in FIG. 3). The output characteristic $U_0$ of the switch-mode power supply 20 is in the range $I_{OS} < I_0 < I_K$:

$$U_0(I_0) = U_0(I_{OS}) - k * m * R_P * I_0$$

The power supply device according to the invention is used in all systems in which redundant switch-mode power supplies are needed for purposes of safety during a power failure or such-like. The invention can particularly be employed in telecommunications systems, computer systems and all other kinds of control and communications systems which need a failure-proof energy supply. In addition to the loads connected to the power supplies, batteries can also be connected which take over the supply of energy during a power failure. In its output characteristic, the power supply device according to the invention thus provides an operating range for normal operation, an operating range for charging operation under higher load and an operating range for a cut-off when there is an overload.

Figure 6:
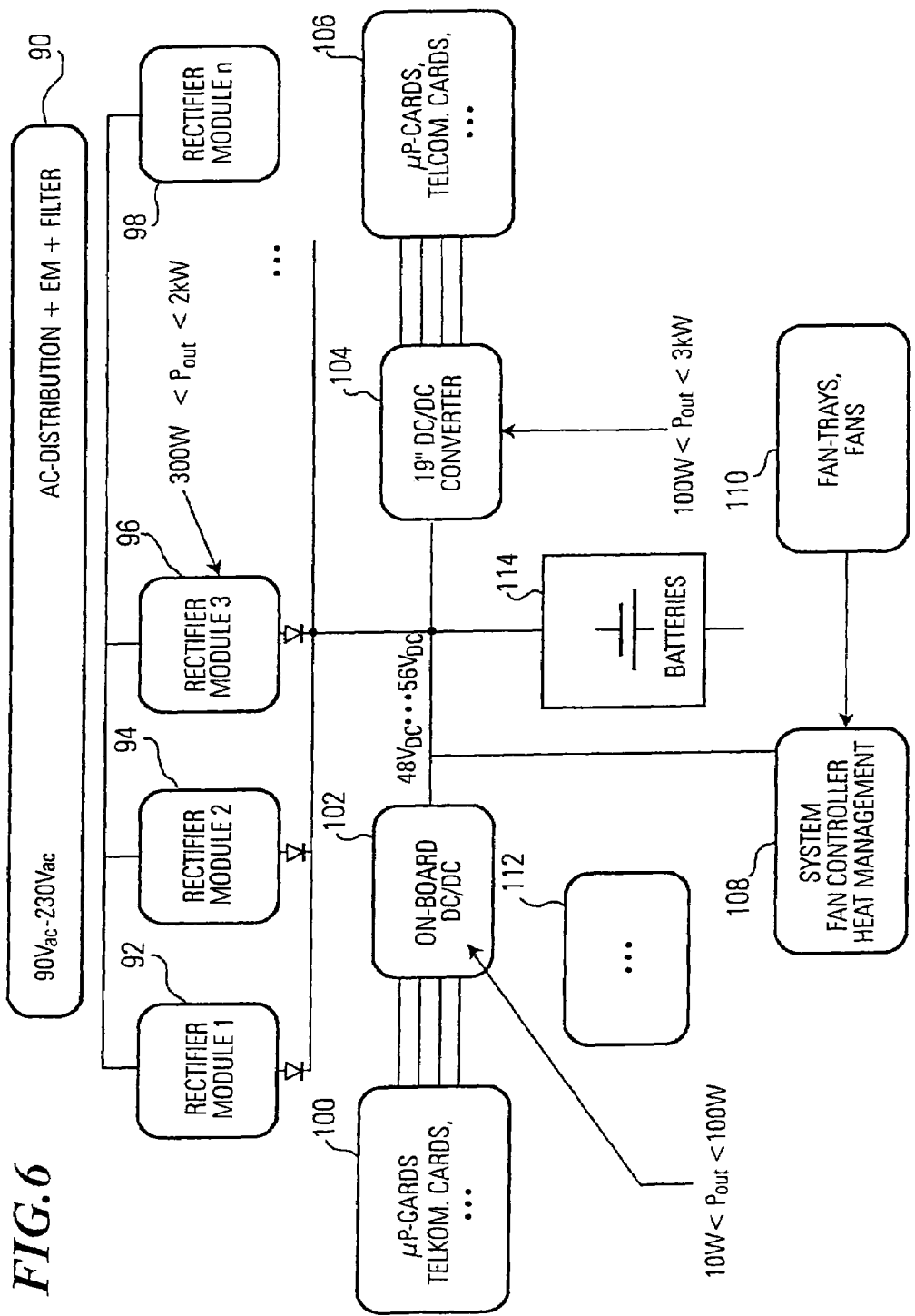
FIG. 6 shows a schematic block diagram of a power supply device according to the invention for the supply of several loads.

FIG. 6 shows an example of an environment in which the power supply device according to the invention can be employed. In FIG. 6, a mains supply is indicated in general by 90, the mains supply 90 providing an AC voltage in the range of 90 to 230 volts and having a device for the distribution of the AC voltage to several switch-mode power supplies and the necessary interference filters on the mains side and other necessary filter devices. The mains 90 supply n switch-mode power supplies 92, 94, 96, 98 that are indicated in FIG. 6 by Rectifier Module. In the illustrated embodiment, the switch-mode power supplies 92–98 should be able to provide an output power POUT of between 300 W and 2 kW. A control device, as described in reference to FIG. 4, is associated with each switch-mode power supply of FIG. 6 in order to establish a desired output characteristic, the control devices not being illustrated in FIG. 6. The switch-mode power supplies 92–98 are connected via a common line to several loads 100–112 as well as to batteries 114, all of which operate with a voltage in the range of 48 volts DC to 56 volts DC and which can have different power requirements, power ranges POUT from 10 watt to 100 watt and from 100 W to 300 kW being given by way of example. The loads 100–112 can include micro processor cards, telecommunications cards, DC converters on cards in electronic data processing systems, 19 inch DC converters for server cabinets or suchlike, all kinds of electric and electronic systems, ventilators and air conditioning units and suchlike. One example of the invention's application is in telecommunications systems which have all these components. In normal operation, i.e. in range I of the characteristic shown in FIG. 3, the power supplies 92–98 supply the loads 100–112 with an essentially uniform current flow and maintain the voltage of the batteries 114 at a required level, e.g. 48–56 V. When the voltage level of the batteries 114 falls during start-up or due to a disruption, during maintenance or such like, the switch-mode power supplies 92–98 have to recharge the batteries 114 in addition to supplying the loads 100–112 so that the output current of the switch-mode power supplies 92–98 increases due to the heavier load which means that the output characteristic of the switch-mode power supplies moves into operating range II. Once the batteries 114 have been fully charged, the current drain generally decreases again so that normal operation in operating range I can once more be assumed. In the event of a malfunction or failure in which an excessively large current I0>I0S is drawn, the output characteristic of the switch-mode power supplies 92–98 moves into the third operating range III, which, after another increase in the output current $I_0$ results in the switch-mode power supplies 92–98 being short-circuited and not delivering any more voltage. The system illustrated in FIG. 6 can then be supplied for a limited period by the batteries 114 before it cuts out completely unless the failure or malfunction is remedied.

The characteristics revealed in the above description, the claims and the figures can be important for the realization of the invention in its various embodiments both individually and in any combination whatsoever.

IDENTIFICATION REFERENCE LIST

10, 11, 12 Switch-mode power supplies
13 Consuming unit
20 Switch-mode power supply
22 Switch
24 Storage capacitor
26 Output transformer
28 Output/free-wheeling diode
30 LC circuit
32 Load resistor
34, 35, 36, 37 Rectifier diodes
38 Storage and smoothing inductor
40 Switch
42 Output/free-wheeling diode
44 Storage capacitor
50 First stage
51, 52, 53 Resistors
54 Operational amplifier
56 Blocking diode
58 Current reduction device
60 Second stage
61 Switch
62 Transformer
63 Zener diode 64 Capacitor
65 Resistor
68 Controlled switch
70 Third stage
71 Input diode
72 Capacitor
73 Resistor
74 Amplification circuit
75 Output diode
80 Pulse width modulation circuit
90 Mains supply
92, 94, 96, 98 Switch-mode power supplies
100–112 Consuming unit
114 Battery

The invention claimed is:

1. A power supply device having several switch-mode power supplies connected in parallel to supply at least one load (32), each switch-mode power supply generating an output current $I_O$ and an output voltage $U_O(I_O, R_L)$ that is a function of the output current $I_O$ and a load resistance $R_L$, and having a control device for each switch-mode power supply, wherein the control device has a first stage (50) having a P element (54) that receives a P element input voltage which is derived from the output voltage $U_O(I_O, R_L)$, and generates a P element control voltage $U_{VS}$, that is used to control the respective switch-mode power supply, the first stage being active when $0 \leq I_O \leq I_{OP}$,
   a second stage (60) having a current imaging circuit which reproduces the output current $I_O$ of the respective switch-mode power supply and generates an output current control voltage $U_P$ which is used to control the respective switch-mode power supply, the second stage being active when $I_{OP} \leq I_O \leq I_{OS}$, and
   a third stage (70) having an amplifier circuit (74) which amplifies a signal proportional to the output current $I_O$ and generates an amplified output current control voltage $m \cdot U_S$ which is used to control the respective switch-mode power supply, the third stage being active when $I_{OS} \leq I_O \leq I_K$,
   wherein $I_{OP}$ is a first threshold value of the output current $I_O$; $I_{OS}$ is a second threshold value of the output current $I_O$; and $I_K$ characterizes a short circuit current limitation.

2. A power supply device according to claim 1, wherein the second stage is also active when $I_{OS} \leq I_O$.

3. A power supply device according to claim 1 wherein $I_{OP}$ is a first threshold value of the output current $I_O$ which characterizes the limit of a normal operating range; and $I_{OS}$ is a second threshold value of the output current $I_O$ which characterizes the limit of an operating range with a heavier load.

4. A power supply device according to claim 1, wherein the control device has a pulse width modulation circuit (80) which receives the P element control voltage $U_{VS}$, the output current control voltage $U_P$ and the amplified output current control voltage $U_S$ and generates a control signal $U_T$ for the respective switch-mode power supply in response thereto.

5. A power supply device according to claim 4, wherein the first stage (50) has a voltage divider (51, 52, 53) that generates a P element input voltage proportional to the output voltage $U_O$.

6. A power supply device according to claim 5, wherein the P element (54) of the first stage (50) has an operational amplifier, one of whose inputs receives the P element input voltage and whose other input receives a first reference voltage $U_{REF1}$ and whose output emits the P element control voltage $U_{VS}$.

7. A power supply device according to claim 6, wherein the operational amplifier (54) is connected to the pulse width modulation circuit (80) via a blocking diode (36).

8. A power supply device according claim 1, wherein the second stage (60) has a transformer element (62) that is connected in parallel to the main transformer element (26) of the respective switch-mode power supply and generates an output signal that is proportional to the output current $I_O$ of the switch-mode power supply.

9. A power supply device according to claim 8, wherein downstream from the transformer element (62), a zener diode (63) and an RC circuit (64, 65) are connected which generate the output current control voltage $U_P$ as a function of the transformer output signal when $I_O \leq I_{OP}$, $U_P$ being proportional to $I_O$.

10. A power supply device according to claim 1, wherein the third stage (70) is connected downstream from the second stage (60) and the output current control voltage $U_P$, which is proportional to the output current $I_O$ of the switch-mode power supply, forms the input signal of the third stage (70).

11. A power supply device according claim 1, wherein the third stage (70) is connected in parallel to the second stage (60) and has a further current imaging circuit which reproduces the output current $I_O$ of the switch-mode power supply.

12. A power supply device according to claim 10 wherein the third stage (70) has an amplifier circuit (74) one of whose inputs is connected to the current imaging circuit via a further RC circuit (72, 73) and whose other input is connected to the reference voltage $U_{REF3}$ and whose output emits the amplified output current control voltage mUs.

13. A power supply device according to claim 12, wherein the amplifier circuit (74) of the third stage (70) is designed in such a way that it has a high amplification factor $m \gg 1$.

14. A power supply device according to claim 11, wherein the third stage (70) has an amplifier circuit (74) one of whose inputs is connected to the current imaging circuit via a further RC circuit (72, 73) and whose other input is connected to the reference voltage $U_{REF3}$ and whose output emits the amplified output current control voltage mUs.

15. A power supply device according to claim 14, wherein the amplifier circuit (74) of the third stage (70) is designed in such a way that it has a high amplification factor $m \gg 1$.

* * * * *

UNITED STATES PATENT AND TRADEMARK OFFICE
CERTIFICATE OF CORRECTION

PATENT NO. : 7,046,524 B2 Page 1 of 1
APPLICATION NO. : 10/508825
DATED : May 16, 2006
INVENTOR(S) : Hans Hoffman et al.

It is certified that error appears in the above-identified patent and that said Letters Patent is hereby corrected as shown below:

<u>Column 12, claim 9</u>

Line 24, delete the symbol --$\leq$-- after "$I_0$" and before "$I_{0P}$," and replace with --$\geq$--

Signed and Sealed this

Twenty-fifth Day of July, 2006

JON W. DUDAS
*Director of the United States Patent and Trademark Office*